(12) United States Patent
Shoshi et al.

(10) Patent No.: US 7,655,308 B2
(45) Date of Patent: Feb. 2, 2010

(54) FILM FOR OPTICAL APPLICATIONS

(75) Inventors: Satoru Shoshi, Koshigaya (JP); Yuki Hongo, Nakano-ku (JP); Hideo Seno, Kawaguchi (JP)

(73) Assignee: Lintec Corporation, Tokyo (JP)

( * ) Notice: Subject to any disclaimer, the term of this patent is extended or adjusted under 35 U.S.C. 154(b) by 468 days.

(21) Appl. No.: 10/977,605

(22) Filed: Oct. 28, 2004

(65) Prior Publication Data

US 2005/0238879 A1 Oct. 27, 2005

(30) Foreign Application Priority Data

Nov. 11, 2003 (JP) ............................ 2003-381436

(51) Int. Cl.
*B32B 27/40* (2006.01)
*B32B 27/32* (2006.01)
*B32B 27/36* (2006.01)

(52) U.S. Cl. .............. 428/423.1; 428/423.7; 428/424.7; 428/424.8; 428/425.1

(58) Field of Classification Search .............. 428/423.1, 428/423.3, 423.7, 425.1, 424.7, 424.8
See application file for complete search history.

(56) References Cited

U.S. PATENT DOCUMENTS

| 6,171,698 B1 * | 1/2001 | Khudyakov et al. ......... 428/378 |
| 6,329,041 B1 * | 12/2001 | Tsuchiya et al. ......... 428/195.1 |
| 6,489,376 B1 * | 12/2002 | Khudyakov et al. ........... 522/96 |
| 6,562,440 B1 | 5/2003 | Tsuchiya et al. |
| 2002/0098350 A1 | 7/2002 | Yoshihara et al. |

FOREIGN PATENT DOCUMENTS

| JP | 11-300873 A | 11/1999 |
| JP | 2000-71392 A | 3/2000 |
| JP | 2001-205179 A | 7/2001 |
| JP | 2002-265650 A | 9/2002 |
| JP | 2003-291236 A | 10/2003 |

OTHER PUBLICATIONS http://translate.google.com/translate?hl=en&sl=ja&u=http://www.niche-de-go.com/products/index.php%3Fflow%3Dshiko&sa=X&oi=translate&resnum=5&ct=result&prev=/search%3Fq%3DUV%2B6300B%2Bshiko%26hl%3Den%26rls%3DGGLD,GGLD:2004-30,GGLD:en.*

* cited by examiner

*Primary Examiner*—Thao T. Tran
(74) *Attorney, Agent, or Firm*—Frishauf, Holtz, Goodman & Chick, P.C.

(57) ABSTRACT

A hard coat film for optical applications which suppresses formation of defects on the surface derived from roughness of the surface of the substrate film, exhibits excellent scratch resistance and crack resistance and suppresses curling of the substrate film is provided. The film for optical applications comprises (A) a layer of a cured resin 2 which comprises 70% by weight or more of a cured resin derived from a difunctional urethane acrylate-based oligomer having a weight-average molecular weight of 3,000 or greater and has a thickness of 5 to 25 μm and (B) a hard coat layer 3 which comprises a resin cured by irradiation with an ionizing radiation and has a thickness of 1 to 15 μm, layers (A) and (B) being successively laminated on one face of a substrate film 1.

20 Claims, 1 Drawing Sheet

FILM FOR OPTICAL APPLICATIONS

BACKGROUND OF THE INVENTION

1. Field of the Invention

The present invention relates to a hard coat film for optical applications and, more particularly, a hard coat film for optical applications which suppresses formation of defects on the surface derived from roughness of the surface of the substrate film, exhibits excellent scratch resistance and crack resistance, suppresses curling of the substrate film, has the function of a hard coat and is advantageously used for a film for a touch panel, a polarizing plate, a ¼ wavelength plate, a cover film of optical disks and a protective film for various displays.

2. Description of Related Art

Touch panels are used as the input apparatus for portable information terminals which are being widely used in recent years. The touch panel is an apparatus for inputting data by directly touching the surface of a display by a finger or a pen.

About 90 percent of the entire touch panels are the touch panels of the resistance film type. The touch panel of the resistance film type has, in general, a structure in which a plastic substrate of the touching side which has a transparent electrically conductive (referred to as "conductive", hereinafter) thin film such as a film of indium oxide doped with tin (ITO) laminated on one face of a transparent plastic substrate and a transparent substrate of the display side which has a transparent conductive thin film such as an ITO film laminated on one face of a transparent substrate material such as a glass plate are arranged with an insulating spacer placed between the two substrates in a manner such that the transparent conductive thin films on the two substrates are faced to each other.

For the input operation, the face for input by touching (the face opposite to the face having the transparent conductive thin film) of the plastic substrate of the touching side is pressed by a pen or a finger and the transparent conductive thin film of the plastic substrate of the touching side and the transparent conductive thin film of the display side are brought into contact with each other.

However, the touch panel of the resistance film type has a problem in that the transparent conductive thin film on the plastic substrate of the touching side is worn, has cracks or is separated from the substrate after repeated input operations, i.e., after the transparent conductive thin film of the plastic substrate of the touching side and the transparent conductive film of the transparent substrate of the display side are repeatedly brought into contact with each other. To overcome the above problem, it is widely conducted that a hard coat layer of a cured resin is disposed between the transparent plastic substrate and the transparent conductive thin film. It is also widely conducted that a hard coat layer is disposed on the surface of the transparent plastic substrate opposite to the surface on which the transparent conductive thin film is disposed.

Development of optical disks as the information recording media in recent years is remarkable. Already, disks used only for reading information such as CD and CD-ROM, optomagnetic disks called MOD or MD, phase-transition disks called PD and writable optical disks called CD-R are widely used. The recording capacity of these disks is about 650 MB (megabytes). Disks having greater capacities such as a series of optical disks called DVD (digital versatile disk) are developed. Specific examples of DVD include DVD-ROM (DVD allowing reading only), DVD-R (DVD allowing additional writing), DVD-RAM (DVD allowing writing and reading) and DVD-RW (DVD allowing rewriting). In these optical disks, a hard coat film is frequently used as the protective film and the cover film.

Various instruments having a liquid crystal display apparatus which are, for example, consumer appliances such as laptop computers, video cameras and portable telephones, displays for instrument panels of automobiles and airplanes and liquid crystal projectors, are being widely used in recent years, and colored display and improvement in luminance and durability are required.

The liquid crystal display apparatus is an apparatus which modulates the incident linearly polarized light using the electro-optical property of the liquid crystal layer and visualizes an image by the difference in the magnitude of transmittance or by color signals using a polarizing plate at the side of emission of the light. In other words, polarized light is used in the principle of displaying by the liquid crystal display apparatus, and the polarizing plate is the essential member of the apparatus. The polarizing plate is a device for changing natural light into a linearly polarized light. In many of the polarizing plate currently mass produced and practically used, in particular, for liquid crystal display apparatuses, a plate prepared by laminating an optically transparent protective film having mechanical strength to one or both faces of a substrate film which is a polarizing film made of polyvinyl alcohol film, tinted or impregnated with iodine or a dichroic material such as a dichroic dye and stretched for orientation, is used. As the protective film, in general, films of triacetylcellulose are used.

In the liquid crystal display apparatus, in general, the polarizing plate described above is disposed not only at the side of emitted light but also at the side of incident light. When the polarizing plate is disposed on the surface side of various display apparatuses such as the liquid crystal display apparatus, sufficient scratch resistance and hardness are required, and it is preferable that the plate has the properties of preventing fouling.

In the liquid crystal display apparatus, in general, the light emitted from the light source is circularly polarized by a circularly polarizing member, then linearly polarized through a ¼ wavelength plate and supplied to the polarizing plate. A hard coat film is disposed also on the ¼ wavelength plate.

When a display such as a plasma display panel (PDP), a cathode ray tube (CRT), a liquid crystal display apparatus (LCD) and an electroluminescence device (ELD) is used, light from the outside is occasionally reflected at the surface of the display and difficulty arises in watching images on the display. In particular, as the size of flat panel displays increases recently, solving the above problem is becoming more important.

To solve the above problem, various treatments for preventing reflection of light and anti-glare treatments have been made on various display apparatuses. As one of such treatments, a film for preventing reflection of light is used for various display apparatuses. For the film for preventing reflection, the hard coat property, i.e., scratch resistance of the surface, is required in combination with the property of preventing reflection.

For preparation of the film for preventing reflection of light, when a dry process such as vapor deposition and sputtering is used, a thin film of a substance having a low refractive index such as $MgF_2$ is formed on a substrate film, or layers of a substance having a great refractive index such as ITO and $TiO_2$ and layers of a substance having a small refractive index such as $MgF_2$ and $SiO_2$ are alternately laminated. When a wet process is used, a hard coat film having the property of preventing reflection of light is prepared in accordance with the coating process. In the wet process, for example, a film of an acrylic resin exhibiting excellent weatherability is used as the substrate. After a layer of a cured resin composition sensitive to an ionizing radiation is formed, the film is treated for preventing reflection of light and used as the protective film for the liquid crystal display apparatus of portable telephones, portable information terminals (PDA) and video cameras.

It is also attempted in a liquid crystal display apparatus that a film for preventing reflection of light is disposed on the protective film of the polarizing plate described above.

For the hard coat film for optical applications used as a touch panel, a polarizing plate, a ¼ wavelength plate, a cover film for optical disks or a protective film of the surface of various displays, it is required that the surface have a great hardness and excellent scratch resistance, form little interference fringes, suppress curling of the film and have few defects derived from roughness of the surface of the substrate film so that excellent clarity of vision through and operability are surely exhibited.

Heretofore, in the preparation of the hard coat film for optical applications, the thickness of the hard coat layer is adjusted so that the above requirements are satisfied. In the actual practice, it is necessary that a hard coat layer having a thickness greater than the really necessary thickness be formed to decrease defects on the surface derived from the roughness of the surface of the substrate film. Under this situation, curling of the hard coat film increases due to shrinkage in the volume of the hard coating agent, and problems arise in that the property for handling deteriorates and that cracks are formed. To decrease the curling of the hard coat film, it is proposed that the surface of the base film (the substrate film) is irradiated with ultraviolet light (for example, Japanese Patent Application Laid-Open No. 2001-205179). However, this method has problems in that the effect of suppressing the curling is insufficient and that the amount and the time of irradiation with ultraviolet light must be increased to sufficiently cure the hard coat layer.

SUMMARY OF THE INVENTION

Under the above circumstances, the present invention has an object of providing a hard coat film for optical applications having the hard coat function which suppresses formation of defects on the surface derived from roughness of the surface of the substrate film, exhibits excellent scratch resistance and crack resistance, suppresses curling of the substrate film and is advantageously used for touch panels, polarizing plates, ¼ wavelength plates, cover films of optical disks and protective films of various displays.

As the result of intensive studies by the present inventors to develop the film for optical applications exhibiting the above excellent properties, it was found that the object could be achieved by disposing on one face of the substrate film a layer having a specific thickness which is made of a cured resin having a specific composition and exhibiting a small shrinkage by curing and by further disposing a layer for preventing reflection of light on the formed hard coat layer. The present invention has been completed based on this knowledge.

The present invention provides:

(1) A film for optical applications which comprises (A) a layer of a cured resin which comprises 70% by weight or more of a cured resin derived from a difunctional urethane acrylate-based oligomer having a weight-average molecular weight in a range of 3,000 to 50,000 and has a thickness of 5 to 25 µm and (B) a hard coat layer which comprises a resin cured by irradiation with an ionizing radiation and has a thickness of 1 to 15 µm, layers (A) and (B) being successively laminated on one face of a substrate film;

(2) The film according to (1), which comprises (C) a layer for preventing reflection of light comprising at least one layer and laminated on layer (B); (3) The film according to any one of (1) and (2), wherein the substrate film is an acetylcellulose-based film, a polycarbonate-based film, a cyclic polyolefin-based film, an acrylic resin-based film or a polyester-based film; (4) The film according to any one of (1) to (3), wherein the hard coat layer of layer (B) has a refractive index of 1.49 to 1.65; and (5) The film according to any one of (1) to (4), which further comprises an adhesive layer having a thickness of 1 to 40 µm and disposed on another face of the substrate film.

Figure 1:
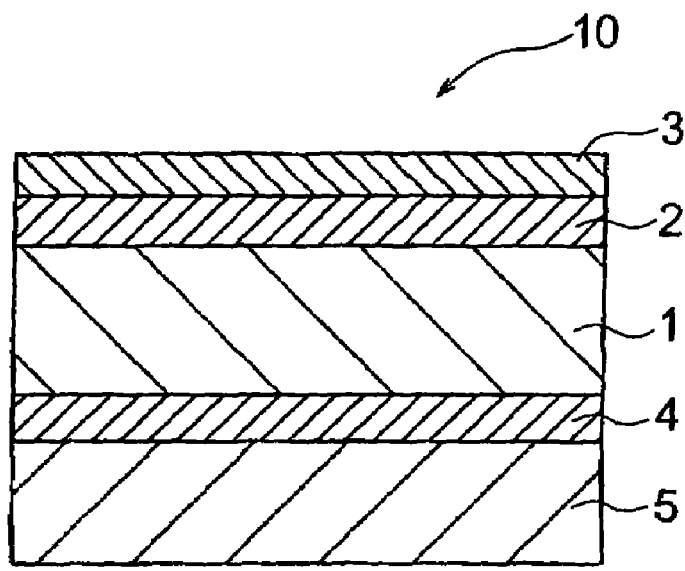
FIG. 1 shows a sectional view exhibiting an example of the structure of the film for optical applications of the present invention.

The numbers in the figures have the meanings as listed in the following:

1 A substrate film
2 A layer of a cured resin
3 A hard coat layer
4 An adhesive layer
5 A release film
6 A layer for preventing reflection of light
10 and 20 Films for optical applications

DESCRIPTION OF THE PREFERRED EMBODIMENTS

The film for optical applications of the present invention is a laminate film which comprises (A) a layer of a cured resin exhibiting very small shrinkage by curing and (B) a hard coat layer, which are successively laminated on one face of a substrate film.

As the substrate film in the film for optical applications of the present invention, transparent plastic films which are, for example, acetylcellulose-based films such as diacetylcellulose films, triacetylcellulose films and acetylcellulose butyrate films; polycarbonate-based films, cyclic olefin-based films; acrylic resin-based films; polyester-based films such as polyethylene terephthalate films, polybutylene terephthalate films and polyethylene naphthalate films; polysulfone-based films; polyether sulfone-based films; polyether ether ketone-based films; polyimide-based films; and polyether imide-based films, are used. From the standpoint of the optical properties such as transmittance of light, workability, mechanical properties, water absorption which should be small, heat resistance and weatherability, acetylcellulose-based films, polycarbonate-based films, cyclic polyolefin-based films, acrylic resin-based films and polyester-based films are preferable among these substrate films. Triacetylcellulose films, polycarbonate-based films, cyclic polyolefin-based films, acrylic resin-based films and polyethylene terephthalate films are more preferable. The substrate film can be suitably selected in accordance with the application of the film for optical applications.

The substrate film may be colored or colorless and can be suitably selected in accordance with the application. For example, a colorless transparent film is preferable when the film is used for protection of liquid crystal display apparatuses.

The thickness of the substrate film is not particularly limited and suitably selected in accordance with the situation. In general, the thickness is in the range of 15 to 300 µm and preferably in the range of 30 to 250 µm. One or both faces of the substrate film may be subjected to various treatments, where desired, so that adhesion with layers disposed on the surfaces is enhanced. The substrate may be treated with a primer. Examples of the surface treatment include the treatment by corona discharge, the treatment with chromic acid (a wet process), the treatment with flame, the treatment with heated air or irradiation with ultraviolet light in the presence of ozone. The surface treatment is suitably selected in accordance with the type of the substrate film. In general, the treatment by corona discharge is preferable from the standpoint of the effect and the operability.

In many cases, minute roughness is formed on the surface of the substrate film during the preparation of the film. In the film for optical applications of the present invention, the effect of the present invention is effectively exhibited on substrate films having greater roughness of the surface since the formation of defects on the surface derived from the roughness of the surface of the substrate film is suppressed.

In the film for optical applications of the present invention, a layer of a cured resin having very small shrinkage by curing is disposed as layer (A) on one face of the substrate film. The layer of a cured resin is a layer which comprises 70% by weight or more of a cured resin derived from a difunctional urethane acrylate-based oligomer having a weight-average molecular weight of 3,000 or greater. The thickness of the layer is selected in the range of 5 to 25 µm and preferably in the range of 5 to 20 µm.

When the weight-average molecular weight of the difunctional urethane acrylate-based oligomer is smaller than 3,000, the shrinkage by curing increases, and the curling of the obtained film for optical applications cannot be suppressed. When the weight-average molecular weight is excessively great, the formed layer of a cured resin becomes soft, and there is the possibility that the function of the obtained film for optical applications as the hard coat film decreases or the effect of suppressing the formation of defects on the surface is not sufficiently exhibited. It is preferable that the weight-average molecular weight of the difunctional urethane acrylate-based oligomer is in the range of 3,000 to 50,000, more preferably in the range of 5,000 to 35,000 and most preferably in the range of 5,000 to 25,000. The weight-average molecular weight described above is the value obtained by the measurement in accordance with the gel permeation chromatography (GPC) and expressed as the value of the corresponding polystyrene.

In the present invention, the effect of the present invention is exhibited as long as the cured resin derived from the above difunctional urethane acrylate-based oligomer is contained in the layer of a cured resin of layer (A) in an amount of 70% by weight. It is preferable that the content of the cured resin is 80% by weight or greater and more preferably 90% by weight or greater.

The difunctional urethane acrylate-based oligomer described above can be obtained, for example, by selecting a difunctional oligomer from urethane acrylate oligomers which are obtained by esterification with (meth)acrylic acid of polyurethane oligomers obtained by the reaction of a polyisocyanate with a polyether polyol or a polyester polyol.

In the present invention, the layer of a cured resin of layer (A) may further comprise 30% by weight or less, preferably 20% or less and more preferably 10% or less of other cured resins in combination with the cured resin derived from the difunctional urethane acrylate-based oligomer. Examples of the other cured resins include cured resins derived from polymerizable oligomers and polymerizable monomers and thermosetting resins.

Examples of the polymerizable oligomer include urethane acrylate-based oligomers having a functionality of three or greater, polyester acrylate-based oligomers, epoxy acrylate-based oligomers and polyol acrylate-based oligomers. Examples of the polymerizable monomer include monofunctional (meth)acrylate-based monomers and polyfunctional (meth)acrylate-based monomers.

The polyester acrylate-based oligomer can be obtained, for example, by obtaining a polyester oligomer having hydroxyl groups at both ends by condensation of a polyfunctional carboxylic acid with a polyhydric alcohol, followed by esterification of the hydroxyl groups in the obtained oligomer with (meth)acrylic acid; or by obtaining an oligomer having hydroxyl groups at both ends by addition of an alkylene oxide to a polyfunctional carboxylic acid, followed by esterification of the hydroxyl groups of the obtained oligomer with (meth)acrylic acid. The epoxy acrylate-based oligomer can be obtained, for example, by esterification of oxirane rings in an epoxy resin of a bisphenol type or a novolak type having a relatively low molecular weight by the reaction with (meth)acrylic acid. The polyol acrylate-based oligomer can be obtained, for example, by esterification of hydroxyl groups in a polyether polyol with (meth)acrylic acid. The above polymerizable oligomer may be used singly or in combination of two or more.

As the monofunctional (meth)acrylate-based monomer, for example, at least one compound can be suitably selected from methyl (meth)acrylate, ethyl (meth)acrylate, butyl (meth)acrylate, hexyl (meth)acrylate, cyclohexyl (meth)acrylate, 2-ethylhexyl (meth)acrylate, lauryl (meth)acrylate, stearyl (meth)acrylate and isobornyl (meth)acrylate.

As the polyfunctional (meth)acrylate-based monomer, for example, at least one compound can be suitably selected from 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentadienyl di(meth)acrylate, dicyclopentenyl di(meth)acrylate modified with caprolactone, phosphoric acid di(meth)acrylate modified with ethylene oxide, cyclohexyl di(meth)acrylate modified with allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate, dipentaerythritol penta(meth)acrylate modified with propionic acid, dipentaerythritol hexa(meth)acrylate and dipentaerythritol hexa(meth)acrylate modified with caprolactone.

The thermosetting resin is, as shown later, the resin used when the curing system is the heat curing system. Examples of the thermosetting resin include acrylate-based polymers having the carbon-carbon double bond or glycidyl group, unsaturated polyesters, isoprene polymers, butadiene polymers, epoxy resins, phenol resins, urea resins and melamine resins. The thermosetting resin may be used singly or in combination of two or more.

For the layer of a cured resin of layer (A), any of the curing system using irradiation with an ionizing radiation and the heat curing system can be used. The curing system using irradiation with an ionizing radiation is preferable when the operability, the shrinkage by curing and the effect on the substrate film are considered. The curing system using irradiation with an ionizing radiation means the system in which the crosslinking and the curing are achieved by irradiation with a radiation having energy quantum among electromagnetic waves and beams of charged particles, i.e., ultraviolet light or electron beams.

When the curing system using irradiation with an ionizing radiation is used for forming the layer of a cured resin of layer (A), as the first step, a resin composition sensitive to an ionizing radiation which is used for forming layer (A) is prepared. In the resin composition sensitive to an ionizing radiation which is used for forming layer (A), the difunctional urethane acrylate-based oligomer and, where necessary, the polymerizable oligomers and the polymerizable monomers described above (the monofunctional (meth)acrylate-based monomers, the polyfunctional (meth)acrylate-based monomers and the like) in amounts described above are used as the components for forming the cured resin. Where desired, various additives such as photopolymerization initiators, photosensitizers, polymerization inhibitors, crosslinking agents, antioxidants, ultraviolet light absorbents, stabilizers, leveling agents and defoaming agents may be used as long as the object of the present invention is not adversely affected.

As the photopolymerization initiator, one or more compound can be suitably selected as desired from photopolymerization initiators conventionally used for the radical polymerization. Examples of the conventionally used photopolymerization initiator include aryl ketone photopolymerization initiators such as acetophenones, benzophenones, alkylaminobenzophenones, benzyls, benzoins, benzoin ethers, benzyl dimethyl acetals, benzoyl benzoates and α-acyloxime esters; photopolymerization initiators having sulfur such as sulfides and thioxanthones; acylphosphine oxides such as acyl diaryl phosphine oxides; anthraquinones; and other photopolymerization initiators.

When the curing is conducted by irradiation with electron beams, it is not necessary that the polymerization initiator is used.

The amount of the photopolymerization initiator is selected, in general, in the range of 0.2 to 10 parts by weight and preferably in the range of 0.5 to 7 parts by weight per 100 parts by weight of the entire photocurable components.

As the photosensitizer, for example, tertiary amines, p-dimethylaminobenzoic acid esters and thiol-based sensitizers can be used. When the curing is conducted by irradiation with electron beams, it is not necessary that the photosensitizer is used.

The amount of the photosensitizer is selected, in general, in the range of 1 to 20 parts by weight and preferably in the range of 2 to 10 parts by weight per 100 parts by weight of the entire photocurable components.

As the antioxidant, the ultraviolet light absorbent and the photostabilizer, suitable compounds can be selected from the conventionally used antioxidants, ultraviolet light absorbents and photostabilizers. In particular, it is advantageous that antioxidants, ultraviolet light absorbents and photostabilizers of the reactive type having (meth)acryloyl group in the molecule are used. When these compounds are used, components of the antioxidant, the ultraviolet light absorbent and the photostabilizer are bonded to the polymer chain activated by the irradiation with the ionizing radiation. Therefore, dissipation of the components from the cured layer with time is suppressed, and the functions of the components are exhibited for a long period of time.

The resin composition sensitive to an ionizing radiation for forming layer (A) used in the present invention can be prepared by mixing the components for forming the cured resin described above and various additives which are used where desired in amounts prescribed for each component in a solvent which is used where necessary, followed by dissolving or dispersing the components.

Examples of the solvent used above include aliphatic hydrocarbons such as hexane, heptane and cyclohexane; aromatic hydrocarbons such as toluene and xylene; halogenated hydrocarbons such as methylene chloride and ethylene chloride; alcohols such as methanol, ethanol, propanol, butanol and 1-methoxy-2-propanol; ketones such as acetone, methyl ethyl ketone, 2-pentanone, isophorone and cyclohexanone; esters such as ethyl acetate and butyl acetate; and cellosolve solvents such as ethyl cellosolve.

The concentration and the viscosity of the prepared resin composition are not particularly limited as long as the resin composition can be used for coating and can be suitably selected in accordance with the situation.

One face of the substrate film is coated with the above resin composition in accordance with a conventional process such as the bar coating process, the knife coating process, the roll coating process, the blade coating process, the die coating process and the gravure coating process to form a coating film. After the formed film is dried, layer (A) is formed by curing the coating film by irradiation with an ionizing radiation.

As the ionizing radiation, for example, ultraviolet light or electron beams are used. The ultraviolet light can be obtained from a high pressure mercury lamp, a fusion H lamp or a xenon lamp. The amount of the light used for the irradiation is, in general, in the range of 100 to 500 mJ/cm$^2$. Electron beams can be obtained from an electron accelerator. The amount of the beams used for the irradiation is, in general, in the range of 150 to 350 kV. Between these ionizing radiations, ultraviolet light is preferable. When the electron beams are used, the cured film can be obtained without adding a polymerization initiator.

When the curing system using irradiation with the ionizing radiation is used, complete curing may be conducted to obtain layer (A), or incomplete curing (half curing) may be conducted. In the latter case, the complete curing is conducted for the combination of layer (A) and layer (B) after layer (B) is formed as described below.

When the heat curing system is used for forming the layer of a cured resin of layer (A), as the first step, a resin composition of the heat curing type for forming layer (A) is prepared. In the resin composition of the heat curing type for forming layer (A), the difunctional urethane acrylate-based oligomer and, where necessary, the polymerizable oligomers and the polymerizable monomers described above (the monofunctional (meth)acrylate-based monomers, the polyfunctional (meth)acrylate-based monomers and the like) and the thermosetting resins in amounts described above are used as the components for forming the cured resin. Where desired, various additives such as curing agents, polymerization inhibitors, crosslinking agents, antioxidants, ultraviolet light absorbents, stabilizers, leveling agents and defoaming agents may be comprised as long as the object of the present invention is not adversely affected.

Examples of the curing agent include organic peroxides such as dibenzoyl peroxide, dilauroyl peroxide, t-butyl peroxybenzoate and di-2-ethylhexyl peroxydicarbonate; azo compounds such as 2,2'-azobis-isobutyronitrile, 2,2'-azobis-2-methylbutyronitrile and 2,2'-azobis-dimethylvaleronitrile; polyisocyanate compounds such as tolylene diisocyanate, diphenylmethane diisocyanate, isophorone diisocyanate and hexamethylene diisocyanate; polyamines such as phenylenediamine, hexamethylenetetramine, isophoronediamine and diaminodiphenylmethane; acid anhydrides such as dodecenyl succinic anhydride, phthalic anhydride and tetrahydrophthalic anhydride; imidazoles such as 2-methylimidazole, 2-ethylimidazole and 2-phenylimidazole; Lewis acids such as dicyandiamide, p-toluenesulfonic acid and trifluoromethanesulfonic acid; and formaldehyde. As the curing agent, one or more compounds are suitably selected in accordance with the type of the used components for forming the cured resin.

The antioxidant, the ultraviolet light absorbent, the photostabilizer, the solvent and the process of coating are the same as those described above for the curing system using irradiation with the ionizing radiation.

In the heat curing system, one face of the substrate film is coated with the resin composition of the heat curing type for forming layer (A) to form a coating film. The formed coating film is dried and cured, and layer (A) is formed.

The thickness of the layer of the cured resin of layer (A) which is formed using the curing system using irradiation with an ionizing radiation or the heat curing system is selected in the range of 5 to 25 μm. When the thickness is smaller than 5 μm, the effect of smoothing the roughness of the surface of the substrate film is not sufficiently exhibited. When the thickness exceeds 25 μm, shrinkage by curing increases, and cracks are formed in the layer of the cured resin. It is preferable that the thickness of layer (A) is in the range of 5 to 20 μm.

In the film for optical applications of the present invention, a hard coat layer comprising a resin cured by irradiation with an ionizing radiation is laminated as layer (B) on the layer of the cured resin of layer (A) described above.

The hard coat layer of layer (B) may have the anti-glare property depending on the application of the film for optical applications. When the hard coat layer has the anti-glare property, the hard coat layer may comprise various fillers for providing the anti-glare property in combination with the resin cured by irradiation with an ionizing radiation.

The hard coat layer can be formed by coating layer (A) with a coating fluid for forming the hard coat layer comprising, for example, a compound curable by irradiation with an ionizing radiation and, where desired, the filler for providing the anti-glare property and a photopolymerization initiator to form a coating film, followed by curing the coating film by irradiation with an ionizing radiation.

Examples of the compound curable by irradiation with an ionizing radiation described above include photopolymerizable oligomers and/or photopolymerizable monomers. The photopolymerizable oligomer includes oligomers of the radical polymerization type and oligomers of the cationic polymerization type. Examples of the photopolymerizable oligomer of the radical polymerization type include polyester acrylate-based oligomers, epoxy acrylate-based oligomers, urethane acrylate-based oligomers and polyol acrylate-based oligomers. The photopolymerizable oligomer is the same as the polymerizable oligomer described in the process for forming layer (A) using the curing system by irradiation with an ionizing radiation.

As the photopolymerizable oligomer of the cationic polymerization type, in general, epoxy-based resins are used. Examples of the epoxy-based resin include compounds obtained by epoxidation of polyfunctional phenols such as bisphenol resins and novolak resins with epichlorohydrin and compounds obtained by oxidation of linear olefin compounds and cyclic olefin compounds with peroxides.

As the photopolymerizable monomer, polyfunctional (meth)acrylates can be used. Examples of the polyfunctional (meth)acrylate include the compounds described as the examples of the polyfunctional (meth)acrylate monomer in the process for forming layer (A) using the curing system by irradiation with an ionizing radiation. The photopolymerizable monomer may be used singly or in combination of two or more or in combination with the photopolymerizable oligomer described above.

When the photopolymerizable oligomer of the radical polymerization type or the photopolymerizable monomer of the radical polymerization type is used, examples of the photopolymerization initiator which is used where desired include the compounds described as the examples of the photopolymerization initiator in the process for forming layer (A) using the curing system by irradiation with an ionizing radiation. When the photopolymerizable oligomer of the cationic polymerization type is used, examples of the photopolymerization initiator which is used where desired include compounds comprising an onium such as an aromatic sulfonium ion, an aromatic oxosulfonium ion and an aromatic iodonium ions and an anion such as tetrafluoroborate anion, hexafluorophosphate anion, hexafluoroantimonate anion and hexafluoroarsenate anion. The photopolymerization initiator may be used singly or in combination of two or more. The amount of the photopolymerization initiator is selected, in general, in the range of 0.2 to 10 parts by weight per 100 parts by weight of the photopolymerizable oligomer and/or the photopolymerizable monomer. When the compound curable by irradiation with electron beams is used, it is not necessary that the photopolymerization initiator is used.

As the filler for providing the anti-glare property which is used where desired, a suitable filler can be selected as desired from fillers conventionally used for providing the anti-glare property. Examples of the filler include silica particles having an average particle diameter of 1.5 to 7 μm, aggregation of colloidal silica particles with an amine compound having an average particle diameter of about 0.5 to 10 μm and mixtures of silica particles having an average particles diameter of 0.5 to 5 μm and fine particles of a metal oxide having an average particle diameter of 1 to 60 nm. The content of the filler in the hard coat layer can be suitably decided with consideration on the anti-glare property and the scratch resistance of the obtained film for optical applications.

The coating fluid for forming the hard coat layer used in the present invention can be prepared by mixing the compound curable by irradiation with an ionizing radiation described above, the fillers and the photopolymerization initiators which are described above and used where desired and various additives such as reactive silicone compounds, monofunctional monomers, photosensitizers, polymerization inhibitors, crosslinking agents, antioxidants, ultraviolet light absorbents, photostabilizers, leveling agents and defoaming agents in amounts prescribed for each component in a solvent which is used where necessary, followed by dissolving or dispersing the components.

As the reactive silicone compound which is used where desired, silicone compounds having radical polymerizable unsaturated group in the molecule can be used. The silicone compound is a component curable by irradiation of light and has the function of providing the properties of preventing fouling and decreasing friction to the hard coat layer after being crosslinked and cured by irradiation with an ionizing radiation.

As the silicone compound having a radical polymerizable unsaturated group in the molecule, for example, compounds in which (meth)acryloyl group is introduced into a polyorganosiloxane skeleton structure via a spacer such as ethylene group and propylene group, can be used. Preferable examples of the polyorganosiloxane include polydimethylsiloxane, polydiphenylsiloxane and polymethylphenylsiloxane.

Examples of the silicone compound having a radical polymerizable unsaturated group in the molecule include polydimethylsiloxanes modified with (meth)acrylate which are represented by general formula [1]:

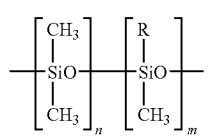

wherein m and n each represent an integer of 1 or greater, and R represents a group represented by the following formula:

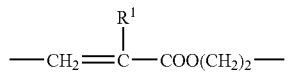

$R^1$ representing hydrogen atom or methyl group; or polydimethylsiloxanes having (meth)acryloyloxy group at one or both ends of the molecule which are represented by general formula [2]:

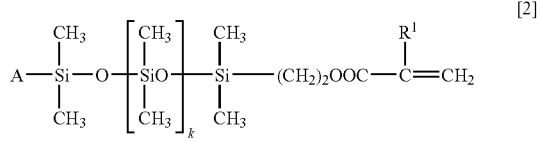

wherein $R^1$ represents hydrogen atom or methyl group, k represents an integer of 1 or greater, and A represents methyl group or a group represented by the following formula:

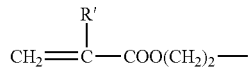

R' representing hydrogen atom or methyl group.

In the present invention, the reactive silicone compound may be used singly or in combination of two or more. It is preferable that the content of the reactive silicone compound is selected in the range of 0.05 to 5% by weight of the hard coat layer. When the content is smaller than 0.05% by weight of the hard coat layer, there is the possibility that the effect of providing the properties of preventing fouling and decreasing friction is not sufficiently exhibited. When the content exceeds 5% by weight, the effect is not improved to the degree expected from the content, and the hardness of the hard coat layer occasionally decreases. It is preferable that the content of the reactive silicone compound is in the range of 0.2 to 2% by weight of the hard coat layer.

Examples of the monofunctional monomer which is used where desired include the compounds described as the examples of the monofunctional (meth)acrylate-based monomer in the description of layer (A) in the above. The photosensitizer, the antioxidant, the photostabilizer and the solvent are the same as those described in the process for forming layer (A) using the curing system by irradiation with an ionizing radiation.

The hard coat layer of layer (B) is formed by coating layer (A) with the coating fluid described above to form a coating film, followed by drying the formed coating film and curing the dried coating film by irradiation with an ionizing radiation. The process of the irradiation and the ionizing radiation used for the irradiation are the same as those described in the process for forming layer (A) using the curing system by irradiation with an ionizing radiation.

The hard coat layer formed as described above has a thickness in the range of 1 to 15 μm. When the thickness is smaller than 1 μm, there is the possibility that the scratch resistance of the film for optical applications is not sufficiently exhibited. When the thickness exceeds 15 μm, cracks are occasionally formed in the had coat layer. It is preferable that the thickness of the hard coat layer is in the range of 2 to 10 μm.

It is preferable that the refractive index of the hard coat layer of layer (B) is in the range of 1.49 to 1.65 since excellent clarity of vision through can be obtained.

In the film for optical applications of the present invention prepared as described above, even when the thickness of the hard coat layer disposed on layer (A) is made smaller than that of conventional films, the physical properties required for the hard coat film for optical applications can be obtained, and the formation of defects on the surface derived from the roughness of the surface of the substrate film is suppressed to increase the yield due to the layer of the cured resin having the specific properties and disposed on the substrate film as layer (A). Due to the small thickness of the hard coat layer, the film for optical applications exhibits excellent crack resistance and suppresses curling of the film.

In the film for optical applications of the present invention, various thin film layers can be formed on the hard coat layer of layer (B) to provide desired functions. Examples of the thin film layer include conductive thin films of indium oxide doped with tin (ITO), indium oxide, tin oxide, zinc oxide or cadmium oxide and a film for preventing reflection of light.

The conductive thin film can be formed, in general, in accordance with the physical vapor deposition process (the PVD process) such as the vacuum vapor deposition process, the sputtering process and the ion plating process or in accordance with the chemical vapor deposition process (the CVD process).

The film for preventing reflection of light can be disposed on the hard coat layer of layer (B) in accordance with a dry processes or a wet processes.

The film for optical applications of the present invention comprising, where desired, a layer for preventing reflection of light of layer (C) which comprises at least one layer and is laminated on layer (B) described above will be described in the following.

In the film for optical applications of the present invention, the layer for preventing reflection of light of layer (C) disposed on layer (B) may comprise a single layer structure comprising a single layer or a multi-layer structure comprising a plurality of layers and may be formed in accordance with a dry process or a wet process.

The process for forming the layer for preventing reflection of light in accordance with a dry process will be described in the following.

As the dry process, a process in which a substance having a smaller refractive index than that of the hard coat layer of layer (B) such as $MgF_2$, $CaF_2$ and $SiO_2$ is vapor deposited on layer (B) to form a layer for preventing reflection of light having a single layer structure, or a process in which a substance having a great refractive index such as ITO, titanium oxide, tantalum oxide, indium oxide, zirconium oxide, niobium oxide, hafnium oxide, tin oxide, tin oxide doped with antimony (ATO), zinc oxide and aluminum oxide and a substance having a small refractive index such as $MgF_2$, $CaF_2$ and $SiO_2$ are alternately vapor deposited to form a layer for preventing reflection of light having a multi-layer structure, can be used. For the vapor deposition process, a PVD process such as the vacuum vapor deposition process, the sputtering process and the ion plating process is used.

The thickness of the layer for preventing reflection of light formed as described above is not particularly limited and can be suitably selected in accordance with the situation. In general, the thickness is selected in the range of 0.01 to 1.0 μm and preferably in the range of 0.02 to 0.5 μm.

The wet process is a process in which a coating fluid is applied, and the layer for preventing reflection of light having a single layer structure or a multi-layer structure is formed. For example, the function of preventing reflection of light can be provided to the film for optical applications by disposing a layer for preventing reflection of light such as a siloxane-based film and a fluorine-based film having a thickness of about 0.05 to 1 μm on the surface of the hard coat layer of layer (B). In this process, the antistatic property may be improved when a suitable type of the layer for preventing reflection of light is selected.

The function of preventing reflection of light can be provided to the film for optical applications also by forming a layer for preventing reflection of light which is formed by successively laminating, on the hard coat layer of layer (B), (C-a) a layer having a great refractive index which comprises a resin cured by irradiation with an ionizing radiation and at least two metal oxides including tin oxide doped with antimony (ATO) and has refractive index in the range of 1.65 to 1.80 and a thickness in the range of 60 to 160 nm and (C-b) a layer having a small refractive index which comprises a siloxane-based polymer and has a refractive index in the range of 1.37 to 1.47 and a thickness in the range of 80 to 180 nm.

When the refractive index of layer (C-a) having a great refractive index is smaller than 1.65, it is difficult that the film for optical applications exhibiting excellent property for preventing reflection of light is obtained. When the refractive index of layer (C-a) having a great refractive index exceeds 1.80, it is difficult that the layer is formed since ATO is comprised as the essential component. It is preferable that the refractive index of layer (C-a) is in the range of 1.70 to 1.75.

ATO described above is used for improving adhesion between layer (C-a) and layer (C-b) having a small refractive index which comprises the siloxane-based polymer and is formed on layer (C-a). The content of ATO in layer (C-a) is selected, in general, in the range of 25 to 90% by weight and preferably in the range of 40 to 80% by weight of the entire metal oxide. When the content is smaller than 25% by weight, there is the possibility that adhesion between layer (C-a) and layer (C-b) is insufficient, and also there is the possibility that the desired refractive index is not obtained. When the content exceeds 90%, there is the possibility that strength of layer (C-a) decreases.

The other metal oxide used in combination with ATO is not particularly limited as long as the refractive index is in the range of 1.65 to 1.80 when the thickness of the layer is in the range of 60 to 160 nm. Examples of the other metal oxide include titanium oxide, ITO, tantalum oxide and tin oxide. The other metal oxide may be used singly or in combination of two or more. Metal oxides having a refractive index greater than that of ATO are preferable, and titanium oxide and/or ITO is more preferable.

The content of the metal oxide including ATO in layer (C-a) is not particularly limited and can be suitably selected in accordance with the desired thickness and refractive index of layer (C-a). In general, the content of the metal oxide is in the range of about 200 to 600 parts by weight per 100 parts by weight of the cured resin.

Layer (C-a) can be formed as following. As the first step, a coating fluid is prepared by mixing the compound curable by irradiation with an ionizing radiation, the metal oxides including ATO described above and photopolymerization initiators and various additives such as antioxidants, ultraviolet light absorbents, photostabilizers, leveling agents and defoaming agents which are used where desired in amounts prescribed for each component in a suitable solvent which is used where necessary, followed by dissolving or dispersing the components. The hard coat layer of layer (B) is coated with the prepared coating fluid to form a coating film. The formed coating film is irradiated with an ionizing radiation and cured, and the layer having a great refractive index of layer (C-a) can be formed.

The compound curable by irradiation with an ionizing radiation, the photopolymerization initiator, the solvent used for the preparation of the coating fluid, the process for the coating and the ionizing radiation are the same as those described for the hard coat layer of layer (B).

In the present invention, it is advantageous that the hard coat layer of layer (B) and the layer having a great refractive index of layer (C-a) are formed in accordance with the following process.

As the first step, the layer of the cured resin formed on one face of the substrate film is coated with the coating fluid for forming the hard coat layer to form a coating film, and the formed coating film is irradiated with the ionizing radiation so that the coating film is cured in a intermediately cured condition. When ultraviolet light is used for the irradiation, in general, the amount of the light is in the range of about 50 to 150 $mJ/cm^2$. The intermediately cured layer thus formed is then coated with the coating fluid for forming layer (C-a) to form a coating film. The formed coating film is sufficiently irradiated with the ionizing radiation and cured completely in combination with layer (B) formed above. When ultraviolet light is used for the irradiation, in general, the amount of the light is in the range of about 400 to 1,000 $mJ/cm^2$.

In the manner described above, the hard coat layer of layer (B) exhibiting excellent adhesion between layer (B) and layer (C-a) and the layer having a great refractive index of layer (C-a) are successively formed on layer (A).

In the film for optical applications of the present invention, the layer having a small refractive index of layer (C-b) is formed on the layer having a great refractive index of layer (C-a) formed as described above. The layer having a small refractive index of layer is a layer comprising a siloxane-based polymer and has a refractive index in the range of 1.37 to 1.47 and a thickness in the range of 80 to 180 nm. When the refractive index and the thickness are outside the above respective ranges, it is difficult that the film for optical applications exhibiting the excellent property for preventing reflection of light and the excellent scratch resistance is obtained.

Examples of the layer comprising a siloxane-based polymer include layers comprising inorganic silica-based compounds (including polysilisic acid), polyorganosiloxane-based compounds or mixtures of these compounds. The inorganic silica-based compounds and the polyorganosiloxane-based compounds forming the above layers can be produced in accordance with conventional processes.

For example, the process in which, for example, an alkoxysilane compound represented by general formula [3]:

$$R^2_a Si(OR^3)_{4-a} \quad [3]$$

is partially or entirely hydrolyzed with an inorganic acid such as hydrochloric acid and sulfuric acid or an organic acid such as oxalic acid and acetic acid and polycondensed, is preferable. In the above general formula [3], $R^2$ represents a non-hydrolyzable group which is an alkyl group, a substituted alkyl group (the substituent being a halogen atom, hydroxyl group, thiol group, epoxy group or (meth)acryloyloxy group), an alkenyl group, an aryl group or an aralkyl group, $R^3$ represents a lower alkyl group, a represents 0 or an integer of 1 to 3, a plurality of $R^2$ may represent the same group or different groups when the plurality of $R^2$ are present, and a plurality of $OR^3$ may represent the same group or different groups when the plurality of $OR^3$ are present.

When a compound represented by general formula [3] in which a represents 0, i.e., a tetraalkoxysilane, is completely hydrolyzed, inorganic silica-based compounds are obtained. When this compound is partially hydrolyzed, polyorganosiloxane-based compounds or a mixture of inorganic silica-based compounds and polyorganosiloxane-based compounds is obtained. On the other hand, since a compound represented by general formula [3] in which a represents an integer of 1 to 3 has a non-hydrolyzable group, polyorganosiloxane-based compounds are obtained by complete hydrolysis or partial hydrolysis. In this reaction, a suitable organic solvent may be used so that the hydrolysis can be conducted uniformly.

Examples of the alkoxysilane represented by general formula [3] include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, γ-glycidoxypropyltrimethoxysilane, γ-acryloyloxypropyltrimethoxysilane, γ-methacryloyloxypropyltrimethoxysilane, dimethyldimethoxysilane, methylphenyldimethoxysilane, vinyltrimethoxysilane, vinyltriethoxysilane, divinyldimethoxysilane, divinyldiethoxysilane, trivinylmethoxysilane and trivinylethoxysilane. The alkoxysilane compound may be used singly or in combination of two or more.

In the above process, where necessary, an aluminum compound such as aluminum chloride and a trialkoxyaluminum may be added in a suitable amount.

As another process, using a silicon compound such as sodium meta-silicate, sodium ortho-silicate and water glass (a mixture of sodium silicates) as the raw material, the silicon compound may be hydrolyzed with an acid such as hydrochloric acid, sulfuric acid and nitric acid or a metal compound such as magnesium chloride and calcium sulfate. Free silicic acid is formed by the hydrolysis. This compound is easily polymerized, and a mixture of linear, cyclic and network compounds is obtained although the composition of the mixture is different depending on the type of the material. Polysilisic acid obtained from water glass contains as the major components compounds having linear structures represented by general formula [4]:

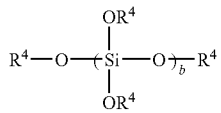

wherein b represents the degree of polymerization, and $R^4$ represents hydrogen atom, silicon atom or a metal atom such as magnesium atom and aluminum atom.

Completely inorganic silica-based compounds can be obtained as described above. As the inorganic silica-based compound, silica gel ($SiO_x.nH_2O$) can also be used.

The layer having a small refractive index of layer (C-b) can be formed by coating the layer having a great refractive index of layer (C-a) with a coating fluid containing the siloxane-based polymer described above or a precursor thereof in accordance with a conventional process such as the bar coating process, the knife coating process, the roll coating process, the blade coating process, the die coating process and the gravure coating process to form a coating film, followed by heating the formed coating film.

It is preferable that the siloxane-based polymer in the formed layer having a small refractive index containing the siloxane-based polymer has silanol group or another hydrophilic group since the antistatic property is provided, and attachment of dusts to the film for optical applications is suppressed.

In the film for optical applications of the present invention, where desired, a coating layer for preventing fouling can be disposed on the layer having a small refractivity of layer (C-b). The coating layer for preventing fouling can be formed, in general, by coating the layer having a small refractive index of layer (C-b) with a coating fluid comprising a fluorine-based resin in accordance with a conventional process such as the bar coating process, the knife coating process, the roll coating process, the blade coating process, the die coating process and the gravure coating process to form a coating film, followed by the drying treatment.

The thickness of the coating layer for preventing fouling is, in general, in the range of 1 to 10 nm and preferably in the range of 3 to 8 nm. Due to the coating layer for preventing fouling, the surface of the obtained film for optical applications is provided with an improved slipping property, and fouling of the surface is suppressed.

In the film for optical applications of the present invention, an adhesive layer for adhering the film for optical applications to an adherend may be formed on the face of the substrate film opposite to the face having the hard coat layer. As the adhesive constituting the adhesive layer, an adhesive for optical applications such as an acrylic adhesive, a urethane adhesive and a silicone adhesive is preferable. The thickness of the adhesive layer is, in general, in the range of 1 to 40 μm and preferably in the range of 5 to 35 μm.

A release film may be disposed on the adhesive layer. Examples of the release film include release films prepared by coating paper such as glassine paper, coated paper and laminate paper or a plastic film with a release agent such as a silicone resin. The thickness of the release film is not particularly limited. In general, the thickness of the release film is in the range of 20 to 150 μm.

Figure 2:
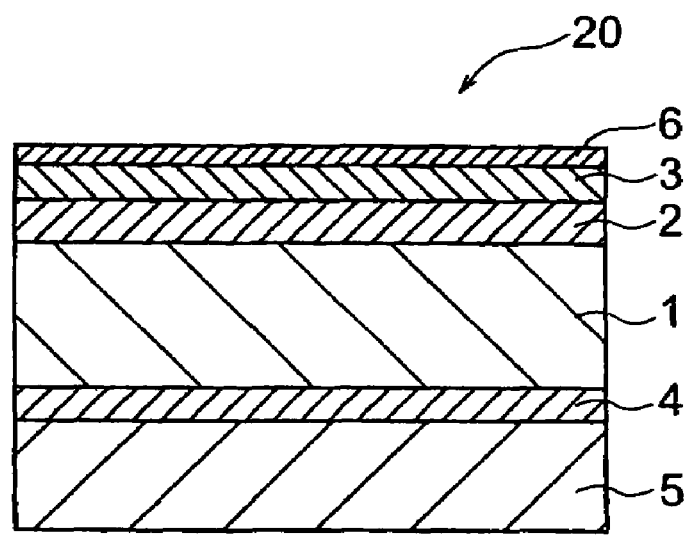
FIG. 2 shows a sectional view exhibiting another example of the structure of the film for optical applications of the present invention.

FIGS. 1 and 2 show sectional views exhibiting examples of films for optical applications of the present invention having different structures. In FIG. 1, a film for optical applications 10 has a structure such that a layer of a cured resin 2 and a hard coat layer 3 are successively laminated on one face of a substrate film 1. An adhesive layer 4 is disposed on the other face of the substrate film 1, and a release film 5 is attached to the adhesive film 4.

In FIG. 2, a film for optical applications 20 has the same structure as that shown in FIG. 1 except that a layer for preventing reflection of light (having a single layer structure or a multi-layer structure) 6 is laminated on the hard coat layer 3.

To summarize the advantages obtained by the invention, in accordance with the present invention, due to the layer of a cured resin which comprises the cured resin derived from the difunctional urethane acrylate-based oligomer and exhibiting very small shrinkage by curing as the main component and is disposed on one face of the substrate film, the hard coat film for optical applications which can achieve the required physical properties as the hard coat film for optical applications, suppresses formation of defects on the surface derived from the roughness of the surface of the substrate film and can increase the yield can be provided even when the thickness of the hard coat layer disposed on the layer of a cured resin is smaller than that of conventional products. This hard coat film for optical applications exhibits excellent crack resistance and suppresses curling of the substrate film due to the small thickness of the film.

EXAMPLES

The present invention will be described more specifically with reference to examples in the following. However, the present invention is not limited to the examples.

The properties of the obtained films for optical applications were measured in accordance with the following methods.

(1) Scratch Resistance

The surface of a layer was rubbed with steel wool #0000 under a load of $9.8 \times 10^{-3}$ N/mm$^2$ in five reciprocal movements, and the condition of the surface was visually observed. The result was evaluated in accordance with the following criterion:

good: no scratches found on the surface
poor: scratches found on the surface (2) Crack Resistance The crack resistance was evaluated in accordance with the cylindrical mandrel method described in Japanese Industrial Standard K5600-5-1. The smaller the value, the smaller the number of formed cracks and the better the crack resistance.

(3) Number of Defects on the Surface

A test piece of 100 mm×100 mm was arbitrarily cut out from a sample. The test piece was placed on a black board and visually examined using reflection of light. Defects found on the surface were marked, and then the entire marked defects were examined by observation using a microscope. The number of defects on the surface was obtained by subtracting the number of defects caused by foreign substances attached to the surface from the number of the entire marked defects.

(4) Degree of Curling

A sample of a size of a square of 100 mm×100 mm was placed on a flat glass plate in a manner such that the face having the hard coat layer was placed upward. The distance by millimeter between the hard coat film and the surface of the glass plate was measured at four corners of the sample of the hard coat film, and the sum of the obtained four values was used as the degree of curling (mm). The maximum distance at one corner was set at 30 mm.

The thickness of each coating layer was measured by "FIL-METRICS F-20" manufactured by MATSUSHITA INTER-TECHNO Co., Ltd. The refractive index was measured by an Abbe refractometer manufactured by ATAGO Co., Ltd.

Example 1

One face of a polycarbonate film (the thickness 100 μm) used as the substrate film was coated with a coating fluid containing a resin composition and having a concentration of solid components of 50% by weight, which was prepared by mixing 100 parts by weight of a difunctional urethane acrylate oligomer [manufactured by NIPPON GOSEI KAGAKU Co., Ltd.; "SHIKO UV-3520TL", the weight-average molecular weight: 14,000; the concentration of solid components: 70% by weight], 3.5 parts by weight of 1- phenyl ketone [manufactured by CIBA SPECIALTY CHEMICALS Co., Ltd.; the trade name: "IRGACURE 184"] as the photopolymerization initiator of an acetophenone compound and a mixed solvent containing toluene and ethyl cellosolve in amounts such that the ratio of the amounts by weight was 1:1, using a Mayer bar No. 20 so that a coating layer having a thickness of 12.5 μm was obtained after curing.

A layer of a cured resin of the urethane acrylate oligomer was formed by drying the formed coating layer at 100° C. for 1 minute and irradiating the dried layer with ultraviolet light (the luminous intensity: 120 mW/cm$^2$; the amount of light: 350 mJ/cm$^2$). The formed layer of a cured resin was coated with a coating fluid for forming a hard coat layer, which was prepared by adding toluene to a hard coating material of the ultraviolet light curing type containing a photopolymerization initiator [manufactured by ARAKAWA KAGAKU KOGYO Co., Ltd.; the trade name: "BEAMSET 575 CB";a mixture of a polyfunctional urethane acrylate and pentaerythritol triacrylate; the concentration of solid components: 100% by weight] in an amount such that the concentration of solid components was adjusted at 50% by weight, using a Mayer bar No. 6 so that a coating layer having a thickness of 3.7 μm was obtained after curing. A hard coat layer was formed by drying the formed coating layer at 100° C. for 1 minute and irradiating the dried layer with ultraviolet light (the luminous intensity: 120 mW/cm$^2$; the amount of light: 250 mJ/cm$^2$).

The properties of the hard coat film for optical applications obtained as described above are shown in Table 1.

Example 2

One face of a cyclic polyolefin film [manufactured by JSR Co., Ltd.; the trade name: ARTONFILM 100; the thickness 100 μm] used as the substrate film was coated with a coating fluid containing a resin composition and having a concentration of solid components of 50% by weight, which was prepared by mixing 100 parts by weight of a difunctional urethane acrylate oligomer "SHIKO UV-3520TL" described above, 3.5 parts by. weight of 1-hydroxycyclohexyl phenyl ketone "IRGACURE 184" described above as the photopolymerization initiator and a mixed solvent containing toluene and ethyl cellosolve in amounts such that the ratio of the amounts by weight was 1:1, using an applicator so that a coating layer having a thickness of 20 μm was obtained after curing.

A layer of a cured resin of the urethane acrylate oligomer was formed by drying the formed coating layer at 100° C. for 1 minute and irradiating the dried layer with ultraviolet light (the luminous intensity: 120 mW/cm$^2$; the amount of light: 350 mJ/cm$^2$). The formed layer of a cured resin was coated with a coating fluid for forming a hard coat layer, which was prepared by adding toluene to a hard coating material of the ultraviolet light curing type containing a photopolymerization initiator [manufactured by DAINICHI SEIKA KOGYO Co., Ltd.; the trade name: "SEIKA BEAM EXF-01L"; the concentration of solid components: 100% by weight] in an amount such that the concentration of solid components was adjusted at 50% by weight, using a Mayer bar No. 8 so that a coating layer having a thickness of 5.0 μm was obtained after curing. A hard coat layer was formed by drying the formed coating layer at 100° C. for 1 minute and irradiating the dried layer with ultraviolet light (the luminous intensity: 120 mW/cm$^2$; the amount of light: 250 mJ/cm$^2$).

The properties of the hard coat film for optical applications obtained as described above are shown in Table 1.

Example 3

A hard coat film for optical applications was prepared in accordance with the same procedures as those conducted in Example 1 except that the coating fluid for forming the hard coat layer was applied using a Mayer bar No. 20 so that a hard coat film having a thickness of 12.5 μm was formed.

The properties of the hard coat film for optical applications obtained as described above are shown in Table 1.

The degree of curling of the hard coat film for optical applications was 110 mm. The degree of curling was suppressed in comparison with that obtained without forming the layer of a cured resin of the urethane acrylate oligomer (Comparative Example 2).

Example 4

A hard coat film for optical applications was prepared in accordance with the same procedures as those conducted in Example 1 except that "UL-503LN" (a trade name) [manufactured by KYOEISHA KAGAKUSHA Co., Ltd.; the weight-average molecular weight: 8,000; the concentration of solid components: 70% by weight] was used as the difunctional urethane acrylate oligomer in place of "SHIKO UV-3520TL" having a weight-average molecular weight f 14,000.

The properties of the hard coat film for optical applications obtained as described above are shown in Table 1.

Example 5

A hard coat film for optical applications was prepared in accordance with the same procedures as those conducted in Example 1 except that the substrate film was changed to a triacetylcellulose film [manufactured by KONICA MINOLTA HOLDINGS Co., Ltd.; the trade name: KC8UN"]. The properties of the hard coat film for optical applications obtained as described above are shown in Table 1.

Example 6

A hard coat film for optical applications was prepared in accordance with the same procedures as those conducted in Example 1 except that the substrate film was changed to an acrylic film having a thickness of 100 μm. The properties of the hard coat film for optical applications obtained as described above are shown in Table 1.

Example 7

(1) A face treated for easy-adhesion of a polyethylene terephthalate (PET) film having a thickness of 188 μm [manufactured by TOYO BOSEKI Co., Ltd.; the trade name: "A4100"] used as the polyester-based substrate film was coated with a layer of a cured resin of the difunctional urethane acrylate oligomer having a thickness of 12.5 μm in accordance with the same procedures as those conducted in Example 1. The formed coating layer was coated with an acrylic hard coating material of the ultraviolet light curing type [manufactured by JSR Co., Ltd.; the trade name: "DESOLITE KZ7224"; the concentration of solid components: 46% by weight] by a Mayer bar No. 12 so that a layer having a thickness of 6.0 μm was obtained after the complete curing. The obtained layer was dried at 80° C. for 1 minute and irradiated with ultraviolet light in an amount of light of 80 mJ/cm$^2$ to prepare an intermediately cured layer, and a hard coat layer was formed.

(2) To 100 parts by weight of a dispersion of titanium oxide [manufacture by DAINIPPON INK KAGAKU KOGYO Co., Ltd.; the trade name: "TF-14D"; the concentration of solid components: 10% by weight] as the metal oxide and 100 parts by weight of a dispersion of tin oxide doped with antimony [manufacture by DAINIPPON INK KAGAKU KOGYO Co., Ltd.; the trade name: "TA-01D"; the concentration of solid components: 10% by weight] (the content of tin doped with antimony: 50% by weight), 6.7 parts by weight of an acrylic resin of the ultraviolet light curing type [manufactured by DAINICHI SEIKA KOGYO Co., Ltd.; the trade name: "SEIKABEAM EXF-01L"(NS); the concentration of solid components: 100%] was added. The obtained mixture was diluted with isobutyl alcohol so that the concentration of solid components in the entire mixture was adjusted at 3% by weight, and a coating fluid was prepared. The hard coat layer in the intermediately cured condition formed in (1) described above was coated with the coating fluid prepared as described above by a Mayer bar No. 4 so that a coating layer having a thickness of 90 nm was obtained after the complete curing. The obtained coating layer was dried at 80° C. for 1 minute and irradiated with ultraviolet light in an amount of light of 680 mJ/cm$^2$ to cure the layer, and a layer having a great refractive index was formed. Thus, the hard coat layer having a refractive index of 1.51 and a layer having a great refractive index of 1.71 were successively formed on the layer of a cured resin of the difunctional urethane acrylate oligomer.

(3) The layer having a great refractive index formed in (2) described above was coated with a siloxane-based antistatic agent [manufactured by COLCOAT Co., Ltd.; the trade name: "COLCOAT P"; the concentration of solid components: 2% by weight] by a Mayer bar No. 6 so that a coating layer having a thickness of 120 nm was obtained after the heat treatment. The formed layer was treated by heating at 130° C. for 2 minutes, and a layer having a small refractive index of 1.45 was formed.

The properties of the obtained hard coat film for optical applications in which the layer for preventing reflection of light was laminated on the hard coat layer are shown in Table 1.

The bottom reflectivity was 1.05% at a wavelength of 580 nm. The bottom reflectivity was measured using a spectrophotometer [manufactured by SHIMADZU SEISAKUSHO Co., Ltd.; "UV-3101PC"]. The reflectivity at the wavelength giving the minimum reflectivity was used as the bottom reflectivity.

TABLE 1

|  | Example |  |  |  |  |  |  |
|---|---|---|---|---|---|---|---|
|  | 1 | 2 | 3 | 4 | 5 | 6 | 7 |
| Substrate film | PC | COP | PC | PC | TAC | acrylic resin | PET |
| Layer of cured resin of difunctional urethane acrylate oligomer | | | | | | | |
| thickness (μm) | 12.5 | 20 | 12.5 | 12.5 | 12.5 | 12.5 | 12.5 |
| Mw of oligomer | 14,000 | 14,000 | 14,000 | 8,000 | 14,000 | 14,000 | 14,000 |
| Hard coat layer | | | | | | | |
| thickness (μm) | 3.7 | 5.0 | 12.5 | 3.7 | 3.7 | 3.7 | 6.0 |
| refractive index | 1.53 | 1.53 | 1.53 | 1.53 | 1.53 | 1.53 | 1.51 |
| Properties of hard coat film | | | | | | | |
| scratch resistance (steel wool) | good | good | good | good | good | good | good |
| crack resistance (cylindrical mandrel method) | 12 | 16 | 32 | 12 | 12 | 12 | 16 |
| number of defect on surface | 0 | 0 | 0 | 0 | 0 | 1 | 0 |
| degree of curling (mm) | 21 | 54 | 110 | 23 | 23 | 19 | 55 |

Notes
PC: A polycarbonate film
COP: A cyclic polyolefin film
TAC: Triacetylcellulose
PET: Polyethylene terephthalate
Mw: Weight-average molecular weight Comparative Example 1

A hard coat film for optical applications was prepared in accordance with the same procedures as those conducted in Example 1 except that the layer of a cured resin of the difunctional urethane acrylate oligomer was not formed.

The properties of the hard coat film for optical applications obtained as described above are shown in Table 2.

Comparative Example 2

A hard coat film for optical applications was prepared in accordance with the same procedures as those conducted in Example 1 except that the layer of a cured resin of the difunctional urethane acrylate oligomer was not formed, and the thickness of the hard coat layer was changed to 12.5 μm using a Mayer bar No. 20.

The properties of the hard coat film for optical applications obtained as described above are shown in Table 2.

Comparative Example 3

A hard coat film for optical applications was prepared in accordance with the same procedures as those conducted in Example 2 except that the thickness of the layer of a cure resin of the difunctional urethane acrylate oligomer was changed to 2.5 μm using a Mayer bar No. 4 in place of the applicator.

The properties of the hard coat film for optical applications obtained as described above are shown in Table 2.

TABLE 2

|  | Comparative Example |  |  |
|---|---|---|---|
|  | 1 | 2 | 3 |
| Substrate film | PC | PC | COP |
| Layer of cured resin of difunctional urethane acrylate oligomer | | | |
| thickness (μm) | — | — | 2.5 |
| Mw of oligomer | — | — | 14,000 |
| Hard coat layer | | | |
| thickness (μm) | 3.7 | 12.5 | 5.0 |
| refractive index | 1.53 | 1.53 | 1.53 |
| Properties of hard coat film | | | |
| scratch resistance (steel wool) | good | good | good |
| crack resistance (cylindrical mandrel method) | 16 | >32 | 16 |
| number of defect on surface | 21 | 2 | 12 |
| degree of curling (mm) | 33 | >120 | 62 |

Notes
PC: A polycarbonate film
COP: A cyclic polyolefin film
Mw: Weight-average molecular weight As shown by the above results, the film for optical applications of the present invention does not have defects on the surface, exhibits excellent scratch resistance and suppresses the curling.

INDUSTRIAL APPLICABILITY

The hard coat film for optical applications of the present invention suppresses formation of defects on the surface derived from roughness of the surface of the substrate film, exhibits excellent scratch resistance and crack resistance, suppresses curling of the substrate film and is advantageously used for a film for a touch panel, a polarizing plate, a ¼ wavelength plate, a cover film of optical disks and a protective film for various displays.

What is claimed is:

1. A film for optical applications which comprises (A) a layer of a cured resin which comprises 70% by weight or more of a cured resin derived from a difunctional urethane acrylate-based oligomer having a weight-average molecular weight in a range of 5,000 to 50,000 and has a thickness of 5 to 25 μm and (B) a hard coat layer which comprises a resin cured by irradiation with an ionizing radiation and has a thickness of 1 to 15 μm, layers (A) and (B) being successively laminated on one face of a substrate film.

2. The film according to claim 1, which comprises (C) a layer for preventing reflection of light comprising at least one layer and laminated on layer (B).

3. The film according to claim 1, wherein the substrate film is an acetylcellulose-based film, a polycarbonate-based film, a cyclic polyolefin-based film, an acrylic resin-based film or a polyester-based film.

4. The film according to claim 2, wherein the substrate film is an acetylcellulose-based film, a polycarbonate-based film, a cyclic olefin-based film, an acrylic resin-based film or a polyester-based film.

5. The film according to claim 1, wherein the hard coat layer of layer (B) has a refractive index of 1.49 to 1.65.

6. The film according to claim 2, wherein the hard coat layer of layer (B) has a refractive index of 1.49 to 1.65.

7. The film according to claim 3, wherein the hard coat layer of layer (B) has a refractive index of 1.49 to 1.65.

8. The film according to claim 4, wherein the hard coat layer of layer (B) has a refractive index of 1.49 to 1.65.

9. The film according to claim 1, which further comprises an adhesive layer having a thickness of 1 to 40 μm and disposed on another face of the substrate film.

10. The film according to claim 2, which further comprises an adhesive layer having a thickness of 1 to 40 μm and disposed on another face of the substrate film.

11. The film according to claim 3, which further comprises an adhesive layer having a thickness of 1 to 40 μm and disposed on another face of the substrate film.

12. The film according to claim 4, which further comprises an adhesive layer having a thickness of 1 to 40 μm and disposed on another face of the substrate film.

13. The film according to claim 5, which further comprises an adhesive layer having a thickness of 1 to 40 μm and disposed on another face of the substrate film.

14. The film according to claim 6, which further comprises an adhesive layer having a thickness of 1 to 40 μm and disposed on another face of the substrate film.

15. The film according to claim 7, which further comprises an adhesive layer having a thickness of 1 to 40 μm and disposed on another face of the substrate film.

16. The film according to claim 8, which further comprises an adhesive layer having a thickness of 1 to 40 μm and disposed on another face of the substrate film.

17. The film according to claim 1, wherein the layer (A) comprises 90% by weight or more of the cured resin.

18. The film according to, claim 1, wherein the difunctional urethane acrylate-based oligomer has a weight-average molecular weight in a range of 5,000 to 35,000.

19. A film for optical applications which comprises (A) a layer of a cured resin which consists essentially of a cured resin derived from a difunctional urethane acrylate-based oligomer having a weight-average molecular weight in a range of 5,000 to 50,000 and has a thickness of 5 to 25 μm and (B) a hard coat layer which comprises a resin cured by irradiation with an ionizing radiation and has a thickness of 1 to 15 μm, layers (A) and (B) being successively laminated on one face of a substrate film.

20. The film according to claim 19, wherein layer (A) further comprises 30% by weight or less of cured resins derived from at least one oligomer selected from the group consisting of a urethane acrylate oligomer having a functionality of three or greater, a polyester acrylate oligomer, an epoxy acrylate oligomer and a polyol acrylate oligomer.

* * * * *